Figure 1:
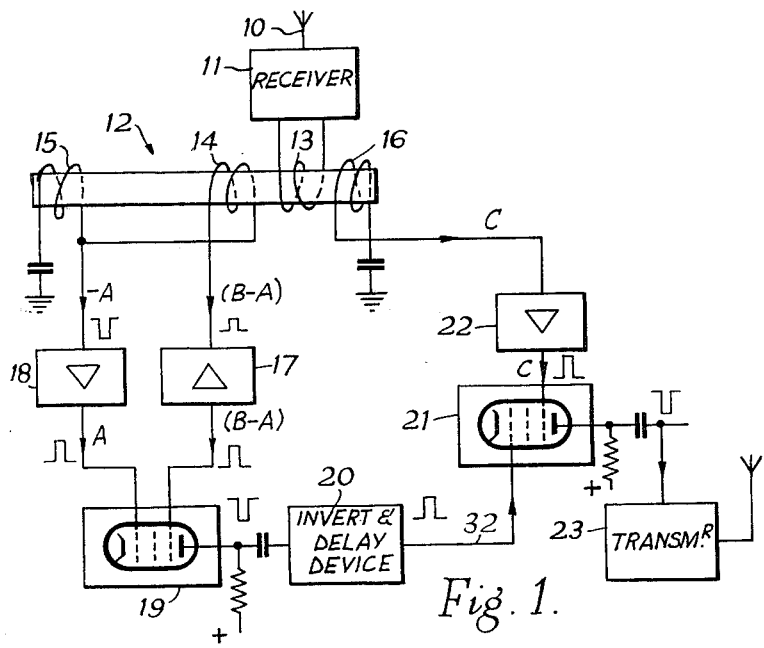

Dec. 8, 1964   K. E. HARRIS ETAL   3,160,884
TRANSPONDERS FOR USE IN SECONDARY RADAR SYSTEMS
Filed May 28, 1959   2 Sheets-Sheet 1

INVENTORS
Kenneth E. Harris
Leonard Perkins

BY
Ralph B. Stewart
ATTORNEY 3,160,884
TRANSPONDERS FOR USE IN SECONDARY
            RADAR SYSTEMS
Kennyth Ernest Harris, New Barnet, and Leonard Perkins,
  Twickenham, England, assignors to A. C. Cossor Limited, London, England
    Filed May 28, 1959, Ser. No. 816,554
Claims priority, application Great Britain, June 9, 1958,
                  18,378/58
            2 Claims. (Cl. 343—6.8)

The present invention relates to transponders for use in secondary radar systems of the type in which recurrent sets of pulses of radio frequency oscillations are transmitted, at least one pulse of each set being a control pulse radiated from an aerial of low directivity and at least one pulse of each set being an interrogating pulse radiated from a directive aerial.

In the specification of patent application Serial No. 710,031, now U.S. Patent No. 3,048,835, there is described and claimed a transponder for use in a secondary radar system in which each set of pulses consists of one control and one interrogating pulse, the transponder comprising a receiver for receiving the pulses having its output coupled to a normally closed gate device through a delay device adapted to effect a delay substantially equal to the time interval between the pulses of each pair, the gate device being opened only when pulses substantially coincident in time derived from the received control and interrogating pulses are applied thereto and when the received control and interrogating pulses have a predetermined amplitude relationship, and when open serving to trigger the transmitter of the transponder. This transponder has the advantage over most other forms that it is "captured" by any one co-operating interrogating transmitter (and therefore inaccessible to other interrogating transmitters) substantially only for the duration of one of the said sets of pulses.

The present invention is an improvement in or modification of the invention claimed in application Serial No. 710,031 and has for its principal object to provide still further discrimination against unwanted signals while retaining the advantage set forth in the preceding paragraph.

According to the present invention there is provided a transponder for use in secondary radar systems of the type specified employing at least three pulses in each set, of pulses comprising a receiver having its output connected to a pulse delay device adapted to derive at least one pair of pulses which are coincident with one another when the pulses of the set are in predetermined time relation, and comparator apparatus adapted firstly to compare the amplitudes of the pulses in the said pair and provide an amplitude control pulse when the amplitudes of the pulses in the pair are in predetermined amplitude relation, and secondly to compare the instants of occurrence of the amplitude control pulse and a time control pulse which may be a further derived pulse, or a pulse dependent upon coincidence of two or more further derived pulses, the comparator serving to trigger a transmitter of the transponder on coincidence of the amplitude control and time control pulses.

Figure 2:
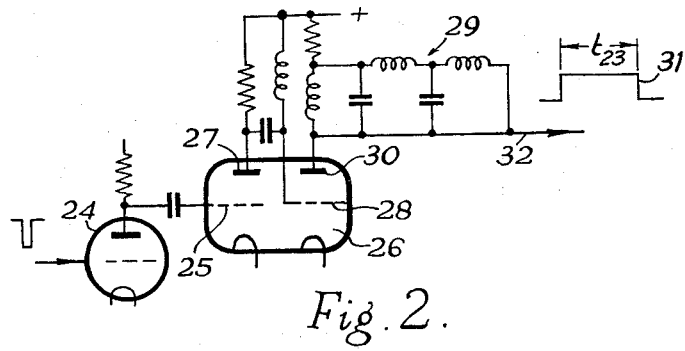
Figure 3:
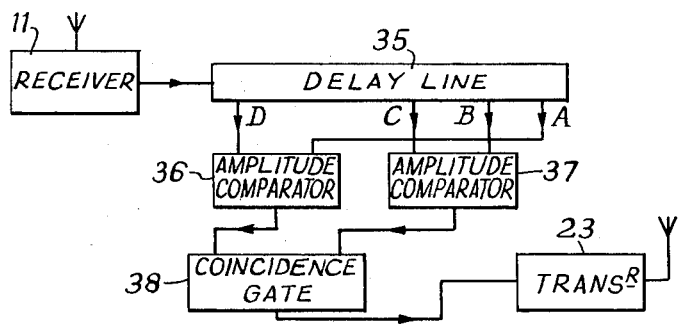

The invention will be described, by way of example, with reference to the accompanying drawing in which
  FIG. 1 is a circuit diagram of one embodiment,
  FIG. 2 is a circuit diagram of one form that a delay device in FIG. 1 may take, and
  FIG. 3 is a block circuit diagram of another embodiment of the invention.

Referring to FIG. 1, the receiving aerial 10 of a transponder is coupled to a receiver 11 the output of which is applied to a delay device 12. This device may take many different forms such, for example, as electro-magnetic, piezo-electric, or magneto-strictive. A magneto-strictive delay line is shown at 12 and has an input winding 13 coupled to the output of the receiver 11, and two output windings 14 and 15. These windings are so spaced that the time delay between windings 14 and 15 corresponds to the time interval between two pulses A and B of a set of pulses. The pulses of each set are assumed to occur in the order A, B, C, of which B and C are interrogating pulses radiated from a directional aerial and the other pulse A is a control pulse radiated from an omni-directional aerial.

The windings 14 and 15 are connected to one another, as shown, and to the inputs of amplifiers 17 and 18. The sense of the connections is such that the pulse fed to the amplifier 18 is a negative-going pulse A while that fed to the amplifier 17 is a positive-going pulse representing the difference between A and B. This pulse will be positive-going only when the amplitude of B exceeds that of A. The amplifier 18 is phase-reversing while the amplifier 17 is not. The result is that a positive-going pulse corresponding to pulse A and, when B exceeds A, a positive-going pulse corresponding to (B—A), are produced at the outputs of the amplifiers 18 and 17. Owing to the action of the delay device 12, these pulses occur simultaneously.

These positive-going pulses are applied to two grids of a pentode 19 forming a coincidence gating device and generate a negative-going pulse at the anode thereof.

The amplifier 17 may be so biased as to pass a positive-going pulse only when its amplitude (B—A) exceeds a predetermined value. Alternatively any necessary amplitude selection may be performed by suitably biasing the suppressor grid of the pentode 19.

The negative-going pulse from 19 is applied to a sense-inverting and delay device 20 which generates at its output a positive-going pulse delayed relatively to the input pulse by a time substantially equal to the time interval between pulses B and C. The sense inversion may, for example, be effected by means of an amplifier having one or some other odd number of stages. The delay device may take any convenient form, such, for example, as a magneto-strictive delay line or a multivibrator which will be described later.

The delayed positive-going pulse from 20 is applied to one grid of another coincidence gating device shown as constituted by a pentode 21.

The voltage generated in a winding 16 in which there is assumed to be negligible delay relatively to the winding 14 includes a positive-going pulse corresponding to C which is amplified in an amplifier 22 and applied to another grid of the pentode 21. Owing to the delay produced by the device 20 the pulse from 22 corresponding to C occurs at the same time as that of 20 and the two pulses give rise to a negative-going pulse at the anode of the pentode 21, this pulse passing to the transmitter 23 of the transponder which is triggered thereby.

It will be understood that all three pulses will appear in the windings 14, 15 and 16 but only those that produce an effect in controlling the transmitter are referred to.

Amplitude selection may be effected in the amplifier 22 or pentode 21 by suitable biasing in order that triggering shall take place only when the amplitudes of the pulse from 20 and that derived from winding 16 are in predetermined relation.

Referring to FIG. 2, which shows one form that the circuit 20 of FIG. 1 may take, a valve amplifier stage 24 effects a reversal of sign so that a positive-going pulse is applied to the control grid 25 of a multi-vibrator 26. The anode 27 is coupled, as shown, to the control grid 28 and a delay network 29 is arranged in the circuit of anode 30. In the absence of an applied pulse current flows to the anode 30 but is cut off from the anode 27.

When a positive pulse is applied to the grid 25, current flows to the anode 27 and the current to anode 30 is cut off. This condition is maintained for a time determined by the time constant of the coupling between the anode 27 and control grid 28 and this time is made slightly less than the time spacing of pulses B and C. When the anode 30 again passes current a negative-going voltage step is generated at the input of the delay network 29 which has a time delay of $t_1$. This network is short-circuited at its end and hence a voltage step of reversed sign is generated and this step is reflected back to the anode 30. There is therefore obtained at the output 32 a positive-going pulse 31 of duration $2t_1$. This duration is made sufficient to provide a practical tolerance for the time spacing of the pulses B and C.

It is, of course, not essential that, as described, pulses A and B should be compared and the result compared with pulse C: comparisons may be made in other combinations.

FIG. 3 is a circuit diagram of a transponder for use in a secondary radar system transmitting recurring sets of four pulses each. In FIG. 3 the receiver 11 is coupled to a delay line 35. The amplitudes of pulses appearing at tappings A and D are compared in an amplitude comparator 36 and the amplitudes of pulses appearing at tappings B and C are compared in an amplitude comparator 37. These comparators 36 and 37 may each be arranged to operate in the same way as the parts 14, 15, 17 and 18 in FIG. 1. The outputs of the comparators 36 and 37 are applied to the two input terminals of a coincidence gate 38. Only when the pulses at A, B, C and D occur at the correct times and when the amplitude relation of pulses A and D and B and C are correct is an output obtained from the gate 38. Such output is applied to trigger the transmitter 23.

In this example both the time and the amplitude relations of two pairs of pulses are compared, but, if desired, one of the comparisons may be of time only and the other of amplitude only.

Usually the amplitude relation selected to make the apparatus responsive will be one in which the interrogating pulse (or one or more of the interrogating pulses if more than one is transmitted) exceeds the amplitude of the control pulse or pulses.

Any desired number of pulses may be used in each set.

We claim:

1. A transponder for use in secondary radar systems in which a set of at least three time-spaced pulses of radio frequency oscillation is transmitted recurrently, at least one pulse of each set being a control pulse radiated from a low-directivity serial and at least one pulse of each set being an interrogating pulse radiated from a high-directivity aerial and the duration of said set being small compared to the interval between sets, said transponder comprising a receiver for said pulses, first time-delay pulse-transmitting means effecting a time delay equal to the time spacing between a pair of pulses of said set one of which is an interrogating pulse and the other of which is a control pulse, means coupling the output of said receiver to the input of said first time-delay means whereby two pulses coincident in time appear at the output of the first time-delay means and at the output of said receiver respectively in response to said pair of pulses, amplitude-comparing means controlled by said two pulses to generate an amplitude-control pulse in response to the amplitude ratio of the interrogating pulse and control pulse of said pair exceeding a predetermined value first coincidence gate means having two inputs and generating at its output a gating pulse in response to pulses applied simultaneously to the two inputs thereof, first and second coupling circuits coupling the output of said first time-delay means and the output of said amplitude-comparing means to said two coincidence gate inputs respectively, a second coincidence gate means having two inputs and generating at its output a triggering pulse in response to pulses applied simultaneously to the two inputs thereof, third and fourth coupling circuits coupling said receiver and the output of said first coincidence gate respectively to the two inputs of said second coincidence gate, second time-delay means in one of said third and fourth coupling circuits effecting a time delay equal to the time spacing between said amplitude-control pulse and a received pulse other than one of the pulses of said pair, a radio transmitter, and means coupling the output of said second coincidence gate to render said transmitter operative in response to said triggering pulse.

2. In a gating system to be controlled by at least three control pulses spaced apart by fixed time intervals, the combination of a delay-line, receiver means applying said control pulses to an input point on said line, means deriving a pair of output pulses from said line at first and second take-off points spaced apart a distance corresponding to the time interval between two of said control pulses, means combining said output pulses to produce a resultant uni-directional pulse of an amplitude proportional to the difference between the amplitudes of said output pulses and a polarity determined by the output pulse of greater amplitude, a coincidence gate device having two inputs and generating an output pulse only in response to pulses applied simultaneously to the inputs thereof, a connection from said receiver means to one input of said gate device, and means controlled by said resultant pulse for supplying to the other input of said gate device a pulse derived from said resultant pulse, and including means for delaying the transmission of said derived pulse to be coincident with said third control pulse in acting upon said gate device.

References Cited in the file of this patent

UNITED STATES PATENTS

| | | |
|---|---|---|
| 2,706,810 | Jacobsen | Apr. 19, 1955 |
| 2,741,759 | Parker et al. | Apr. 10, 1956 |
| 2,800,651 | Marshall | July 23, 1957 |
| 2,948,854 | Bess | Aug. 9, 1960 |
| 3,048,835 | Perkins | Aug. 7, 1962 |